US00RE44391E

(19) United States
(12) Reissued Patent
Lee

(10) Patent Number: US RE44,391 E
(45) Date of Reissued Patent: *Jul. 23, 2013

(54) APPARATUS AND METHOD OF INTERACTING WITH A MOBILE PHONE USING A TV SYSTEM

(75) Inventor: Jae Kyung Lee, Daegu (KR)

(73) Assignee: LG Electronics Inc., Seoul (KR)

( * ) Notice: This patent is subject to a terminal disclaimer.

(21) Appl. No.: 12/882,954

(22) Filed: Sep. 15, 2010

Related U.S. Patent Documents

Reissue of:
(64) Patent No.: 7,376,441
Issued: May 20, 2008
Appl. No.: 10/225,352
Filed: Aug. 22, 2002

(30) Foreign Application Priority Data

Aug. 24, 2001 (KR) ..... 10-2001-51342

(51) Int. Cl.
*H04M 1/00* (2006.01)
*H04B 1/38* (2006.01)
*H04B 7/00* (2006.01)

(52) U.S. Cl.
USPC ..... 455/556.1; 455/557; 455/556.2; 455/66.1; 455/334; 455/550.1; 341/176; 348/552

(58) Field of Classification Search
USPC ..... 455/557, 556, 66; 348/552
See application file for complete search history.

(56) References Cited

U.S. PATENT DOCUMENTS 4,338,492 A 7/1982 Snopko
4,356,509 A 10/1982 Skerlos et al.
4,855,746 A 8/1989 Stacy
5,880,732 A 3/1999 Tryding
5,920,806 A 7/1999 Gouessant
5,990,882 A * 11/1999 Heinonen et al. ..... 725/133
6,166,778 A 12/2000 Yamamoto et al.
6,459,906 B1 * 10/2002 Yang ..... 455/556.1
6,529,742 B1 3/2003 Yang
6,584,613 B1 6/2003 Dunn et al.
6,772,433 B1 8/2004 LaJoie et al.
6,781,635 B1 8/2004 Takeda (Continued)

OTHER PUBLICATIONS

Office Action dated Feb. 9, 2005.

(Continued)

*Primary Examiner* — Wen Huang
(74) *Attorney, Agent, or Firm* — KED & Associates LLP

(57) ABSTRACT

An apparatus and a method for interacting with a mobile telephone are provided. A remote control unit receives a user command and transmits it to a TV system which recognizes the user command as a telephone function command and transmits the function command to the mobile telephone if the TV system is set to Telephone Mode. The TV system may also output data received from the mobile telephone in response to the transmitted function command. Thus, a user may interact with a mobile telephone using an interactive TV system by displaying text/image data received from the telephone and by inputting various telephone function commands using a remote control unit. Upon receiving a function command from the TV system, the mobile telephone generates output data in response to the function command and transmits itto the TV system. A display unit of the TV system displays the text/image data, and a speaker outputs the sound data. As a result, a user may conveniently interact with a mobile telephone using a display unit and a speaker of an interactive TV system with a remote control unit.

28 Claims, 5 Drawing Sheets

U.S. PATENT DOCUMENTS

| | | | | |
|---|---|---|---|---|
| 6,825,858 | B2 | 11/2004 | Sato | |
| 7,076,734 | B2 * | 7/2006 | Wolff et al. | 715/720 |
| 7,580,005 | B1 | 8/2009 | Palin | |
| 2001/0020247 | A1 * | 9/2001 | Ikeda et al. | 709/206 |
| 2002/0077143 | A1 | 6/2002 | Sharif et al. | |

OTHER PUBLICATIONS

Office Action dated Oct. 6, 2005.
Office Action dated Jun. 16, 2006.
Office Action dated Jun. 13, 2007.
U.S. Office Action for U.S. Appl. No. 12/784,281 dated Feb. 15, 2011.
U.S. Office Action for U.S. Appl. No. 12/882,908 dated Feb. 28, 2011.
U.S. Office Action for U.S. Appl. No. 12/882,821 dated Feb. 28, 2011.
U.S. Office Action for U.S. Appl. No. 12/882,908 dated Jan. 19, 2012.
U.S. Office Action for U.S. Appl. No. 12/882,821 dated Jan. 17, 2012.
U.S. Office Action U.S. Appl. No. 12/882,821 dated Jul. 19, 2012.

* cited by examiner

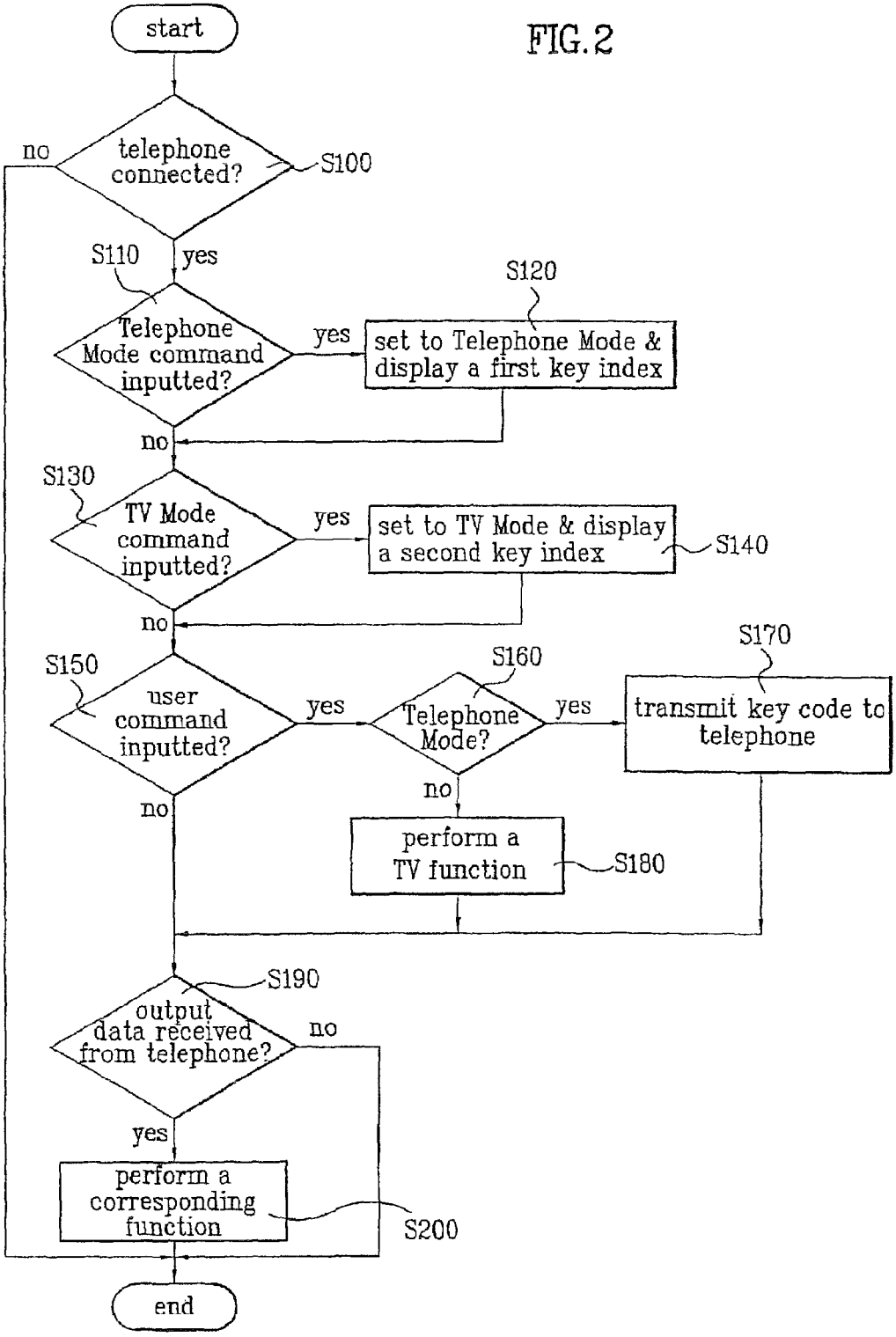
FIG. 2
start
telephone connected?
S100
no
yes
S110
Telephone Mode command inputted?
yes
S120
set to Telephone Mode & display a first key index
no
S130
TV Mode command inputted?
yes
set to TV Mode & display a second key index
S140
no
S150
user command inputted?
yes
S160
Telephone Mode?
yes
S170
transmit key code to telephone
no
no
perform a TV function
S180
S190
output data received from telephone?
no
yes
perform a corresponding function
S200
end

APPARATUS AND METHOD OF INTERACTING WITH A MOBILE PHONE USING A TV SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

*This application is a continuation of a U.S. Reissue application Ser. No. 12/784,281, filed on May 20, 2010, which is a reissue of U.S. Pat. No. 7,376,441, filed on Aug. 22, 2002 and issued on May 20, 2008. Additional continuation reissue applications have been filed based on U.S. Pat. No. 7,376,441 corresponding to U.S. Continuation Reissue application Ser. No. 12/882,908, filed on Sep. 15, 2010, and U.S. Continuation Reissue application Ser. No. 12/882,821, filed on Sep. 15, 2010.*

This application claims the benefit of Korean Patent Application No. P2001-51342, filed on Aug. 24, 2001, which is hereby incorporated by reference as if fully set forth herein.

BACKGROUND OF THE INVENTION

1. Field of the Invention

The present invention relates to a system for a mobile telephone, and more particularly, to apparatus and method of interacting with a mobile telephone using an interactive television system with a remote control unit.

2. Discussion of the Related Art

As there have been high demands from many mobile telephone users, many mobile communication service providers have recently started to provide not only a simple telephonic communication service, but also various supplemental communication services such as an Internet service, text/voice/image message service, and electronic mailing service. In order for a user to use any one of the various supplement services mentioned above, the user must be able to view images that are displayed on a display unit of a mobile telephone and to input one or more desired commands into the mobile telephone by pressing one or more buttons provided on the mobile telephone.

However, the sizes of the key buttons and display units of many existing mobile telephones are significantly limited due to the current trend toward smaller dimensions of the mobile telephones, and this create great inconveniences to many users for properly viewing the image and/or text data and inputting the desired commands by pressing the key buttons provided on the mobile telephones.

SUMMARY OF THE INVENTION

Accordingly, the present invention is directed to apparatus and method of interacting with a mobile telephone using an interactive television system that substantially obviates one or more problems due to limitations and disadvantages of the related art.

An object of the present invention is to provide a method of interacting with a mobile telephone using an interactive television system that provides a significantly improved way of interacting with the mobile telephone.

Another object of the present invention is to provide an apparatus of interacting with a mobile telephone using an interactive television system that provides a significantly improved way of interacting with the mobile telephone.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus of interacting with a mobile telephone according to the present invention includes a remote control unit receiving a user command from a user and remotely transmitting the user command, and a TV system connected to the mobile telephone. The TV system recognizes the user command remotely received from the remote control unit as a telephone function command and transmits the function command to the mobile telephone if the TV system is set to a telephone mode by the user. The TV system further outputs an output data set received from the mobile telephone in response to the transmitted function command.

The mobile telephone of the apparatus includes a TV interface unit interfacing with the television system for receiving the function command from the TV system and transmitting the output data set to the TV system, and a controller generating a control signal for generating the output data set in response to the function command and transmitting the generated output data set to the TV system.

On the other hand, the TV system of the apparatus includes a remote-control interface unit receiving the user command from the remote control unit, a telephone interface unit interfacing with the mobile telephone for transmitting the function command to the mobile telephone and receiving the output data set from the mobile telephone, a microcomputer generating a control signal for outputting the output data set received from the mobile telephone, a video/audio signal processor combining text or image data included in the output data set with an original image data according to the control signal, and a display unit displaying the combined data.

In another aspect of the present invention, a method of interacting with a mobile telephone using a TV system with a remote control unit includes the steps of (a) displaying a telephone key index on a TV display unit of the TV system if the TV system is set to a telephone mode by a user, (b) receiving a first user command from the user through the remote control unit, (c) recognizing the first user command as a telephone function command and transmitting the function command to the mobile telephone, and (d) receiving an output data set that the mobile telephone generates in response to the transmitted function command and displaying image or text data included in the output data set on the TV display unit.

In another aspect of the present invention, a method of interacting with a TV system with a remote control unit for a mobile telephone includes the steps of (a) checking whether the mobile telephone is connected to the TV system, (b) receiving a telephone function command that the TV system generates in response to a user command received from a user through the remote control unit, and (c) generating an output data set in response to the received function command and transmitting the output data set to the TV system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 2 illustrates is a flow chart illustrating a method of interacting with a mobile telephone using an interactive television system according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
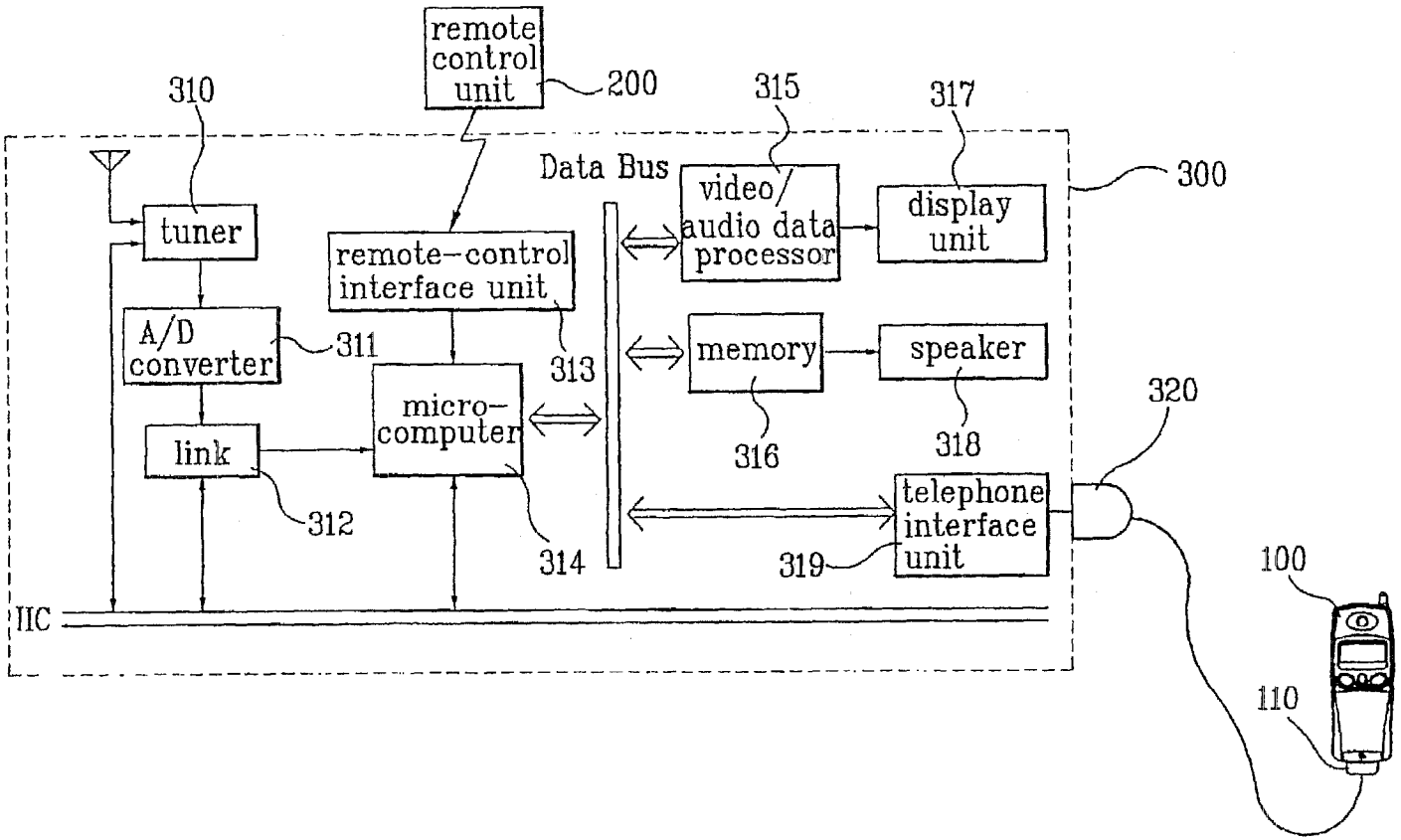
FIG. 1 illustrates an apparatus of interacting with a mobile telephone using an interactive TV system in accordance with the present invention.

FIG. 1 illustrates an apparatus of interacting with a mobile telephone using an interactive television system (TV system) with a remote control unit in accordance with the present invention. As it can be seen from FIG. 1, the apparatus includes a mobile telephone 100 being able to receive or transmit various communication data including text, image, and/or voice data from a sender or to a receiver; an interactive television system 300 that is connected to the mobile telephone 100 and is able to display various data received from the mobile telephone 100; and a remote control unit 200 for enabling a user to set the interactive television system 300 to TV Mode or Telephone Mode. The television system 300 receives the output data from the mobile telephone 100 and displays the image/text data if the user has set the television system 300 to Telephone Mode.

The mobile telephone 100 includes a TV interface unit 110 for interfacing with the interactive television system 300 and further includes a controller (not illustrated) that gives a command for transmitting the output data corresponding to a telephone function command received from the television system 300. A user sets the television system 300 to Telephone Mode for interacting with the mobile telephone 100 or to TV Mode for performing various TV-related functions such as channel up/down and volume up/down functions.

The interactive television system 300 shown in FIG. 1 includes a remote-control interface unit 313 for receiving one or more user commands from the remote control unit 200; a telephone interface unit 319 connected to the mobile telephone 100 through a connection unit 320 for transmitting the user commands to the mobile telephone 100 and receiving the corresponding output data from the mobile telephone 100; a microcomputer 314 generating a control signal for displaying a key index corresponding to Telephone Mode or TV Mode and for outputting the output data received from the mobile telephone 100; a video/audio data processor 315 combining an original image signal with the key index and/or image/text data included in the output data received from the telephone 100; and a display unit 317 displaying the combined data.

In addition, the interactive television system 300 further includes a tuner 310 receiving a broadcasting signal; an A/D converter 311 converting the analog broadcasting signal to a digital broadcasting signal; a link 312 checking and correcting any error included in the converted digital signal; a speaker 318 outputting a sound signal processed in the video/audio data processor 315 according to the control signal of the microcomputer 314; and a memory 316 storing the program information of the microcomputer 314 or other information. The interactive television system 300 may provide not only the video/audio data of the digital broadcasting signal, but also various supplemental program information.

The general functions of the components of the television system 300 will now be described in detail. First, the tuner 310 receives various broadcasting signals including satellite, terrestrial, and cable broadcasting signals. Then the A/D converter 311 converts the broadcasting signals to digital signals and outputs the converted digital signals to the link 312. The link 312 performs error checking and correcting functions and outputs compressed video/audio data streams. In accordance with a control signal generated by the microcomputer 314, the video/audio data processor 315 performs a compensation function on the compressed data streams and converts the compensated data streams to analog image/voice signals. Then the video and audio signals are outputted through the display unit 317 and the speaker 318, respectively.

In addition, when a user inputs a user command by pressing one or more key buttons provided on the remote control unit 200, the remote-control interface unit 313 transmits the user command to the microcomputer 314. Then the microcomputer 314 outputs a control signal for performing a desired function in response to the user command. Any graphic information generated by the microcomputer 314 upon receiving the user command from the remote control unit 200 or other graphic information related to the supplemental program information are transmitted to the video/audio data processing unit 315 via a data bus and are added to the original image signals in accordance with the control signal of the microcomputer 314.

The apparatus according to the present invention enables a user to interact with a mobile telephone 100 by displaying the output data received from the telephone 100 on the display unit 317 of the television system 300 and inputting any telephone function command into the mobile telephone 100 using the remote control unit 200.

The steps showing how the apparatus shown in FIG. 1 actually operates will now be described in detail. First of all, a user connects the mobile telephone 100 with the interactive television system 300 and sets the television system 300 to Telephone Mode or TV Mode by pressing a corresponding mode key button provided on the remote control unit 200 or on a key panel of the television system 300.

When the microcomputer 314 receives a command setting the mode of the television system 300, it generates a corresponding control signal in order for the video/audio data processor 315 to display a corresponding key index on the display unit 317 using an OSD function.

When the television system 300 is set to Telephone Mode, the microcomputer 314 checks whether the mobile telephone 100 is connected to the television system 300. Thereafter, when a user inputs a user command through the remote control unit 200 for controlling the mobile telephone 100, the microcomputer 314 transmits a corresponding telephone function command to the mobile telephone 100. Upon receiving the function command from the television system 300, a controller of the telephone 100 generates a control signal in order to perform a corresponding telephone function such as viewing the phone numbers stored in the telephone 100 or viewing one of the text messages previously received.

Then the mobile telephone 100 transmits any data generated upon performing the function or any text/voice/image data received from an external source to the television system 300 via the TV interface unit 110. Next, the television system 300 outputs the output data or text/voice/image data through the speaker 318 and/or the display unit 317.

The display unit 317 may display the text/image data received from the mobile telephone 100 in a predetermined portion of the display unit 317 with or without the regular images of the broadcasting signal. On the other hand, when the television system 300 being initially set to TV Mode receives a user command from the remote control unit 200 for performing a general TV function such as a power on/off, channel switching, and volume adjusting function, the microcomputer 314 generates a corresponding control signal so that the television system performs the desired TV function.

FIG. 2 is a flow chart illustrating a method of interacting with a mobile telephone 100 using an interactive television system 300 according to the present invention. As shown in the figure, the microcomputer 314 included in the television system 300 initially checks whether the mobile telephone 100 is connected to the television system 300 through a connecting unit 320 (S100). If it is confirmed in the step S100 that the mobile telephone 100 is connected to the television system 300, the microcomputer 314 further checks whether a user has inputted a first command for Telephone Mode by pressing a Telephone Mode button provided on a remote control unit 200 or a key panel of the television system 300 (S110).

Figure 3A:
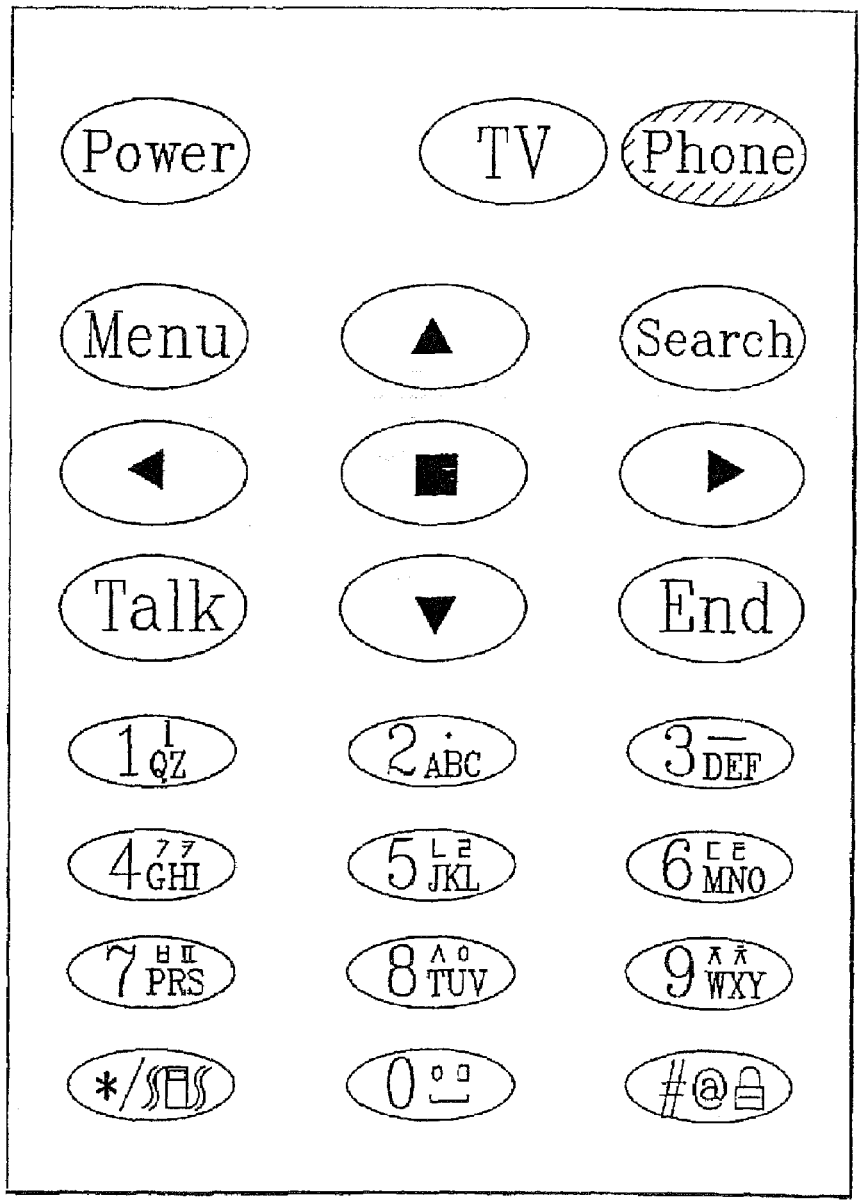
FIG. 3A illustrates a telephone key index that gets displayed on a display unit of the TV system according to the present invention.

If it is confirmed that the first command for Telephone Mode is received, the microcomputer 314 sets the television system 300 to Telephone Mode. Subsequently, a first key index corresponding to Telephone Mode is displayed on a predetermined portion of the display unit 317 of the television system 300 (S120). An example of the first key index that gets displayed on the display unit 317 as the television system 300 is set to Telephone Mode is illustrated in FIG. 3A. The first key index is an On Screen Display (OSD) type index indicating what each key button of the remote control unit 200 represents in Telephone Mode. For example, it includes a mode indicator indicating that the TV system is currently set to Telephone Mode.

Figure 3B:
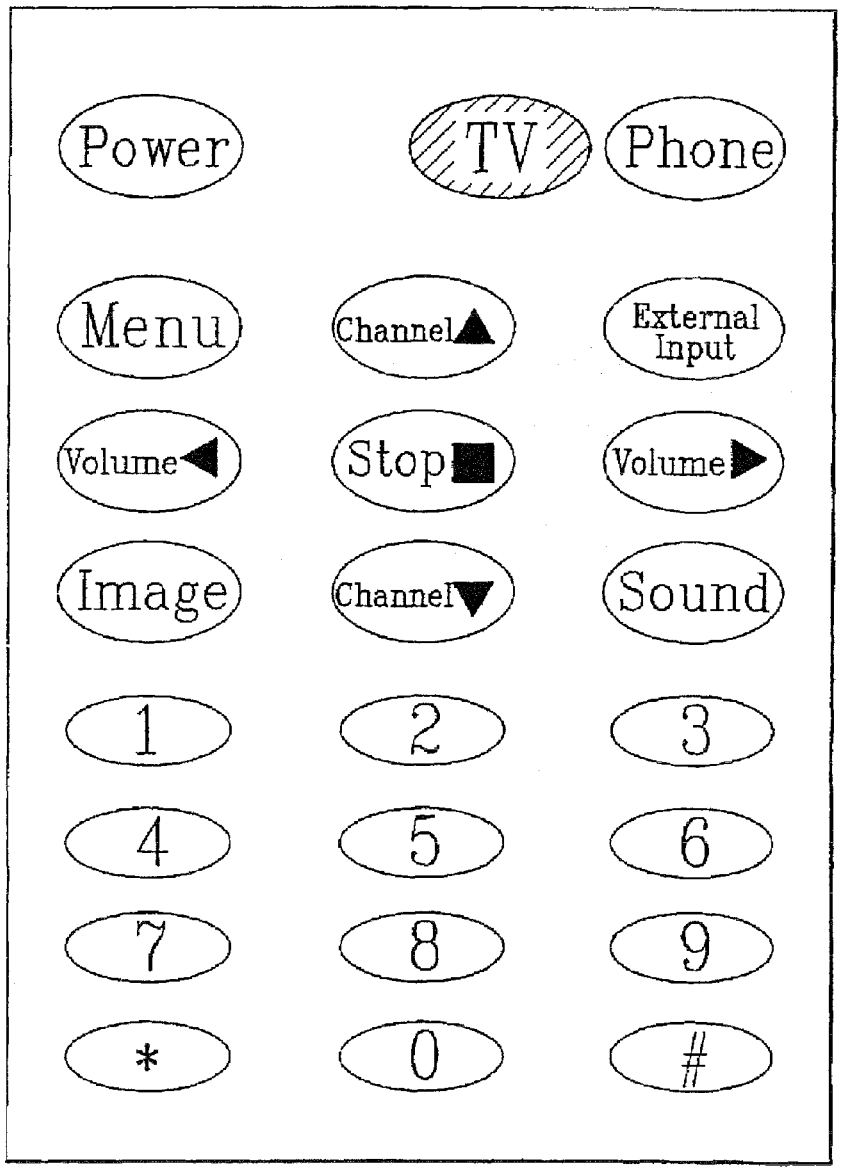
FIG. 3B illustrates a TV key index that gets displayed on a display unit of the TV system according to the present invention.

On the other hand, if it is found in the step S110 that the first command for Telephone Mode is not inputted by the user, the microcomputer 314 checks whether the user has inputted a second command for TV Mode by pressing a TV Mode key button provided on the remote control unit 200 or the key panel of the television system 300 (S130). If it is confirmed in the step S130 that the second command for TV Mode is received, the microcomputer 314 sets the television system 300 to TV Mode. Subsequently, a second key index corresponding to TV Mode gets displayed on a predetermined portion of a display unit 317 (S140). An example of the second key index that gets displayed on the display unit 317 as the television system 300 is set to TV Mode is illustrated in FIG. 3B. The second key index is also an On Screen Display (OSD) type index indicating what each key button of the remote control unit 200 represents in TV Mode. For example, it includes a mode indicator indicating that the TV system is currently set to TV mode.

After the television system 300 is set to either one of Telephone Mode or TV Mode, the microcomputer 314 further checks whether the user has inputted a user command by pressing any key button of the remote control unit other than the Telephone or TV Mode key button (S150). If it is found in the step S150 that such user command is received from the remotely control unit 200, the microcomputer 314 further checks whether the television system 300 is currently set to Telephone Mode or TV Mode (S160). If the present mode is Telephone Mode, the user command is recognized as a telephone function command, and a corresponding key code gets transmitted to the mobile telephone 100 through a telephone interface unit 319 (S170). On the other hand, if the present mode is found to be TV Mode, the user command is recognized as an ordinary TV function command, and the television system 300 performs a TV function corresponding to the TV function command (S180).

Figure 4:
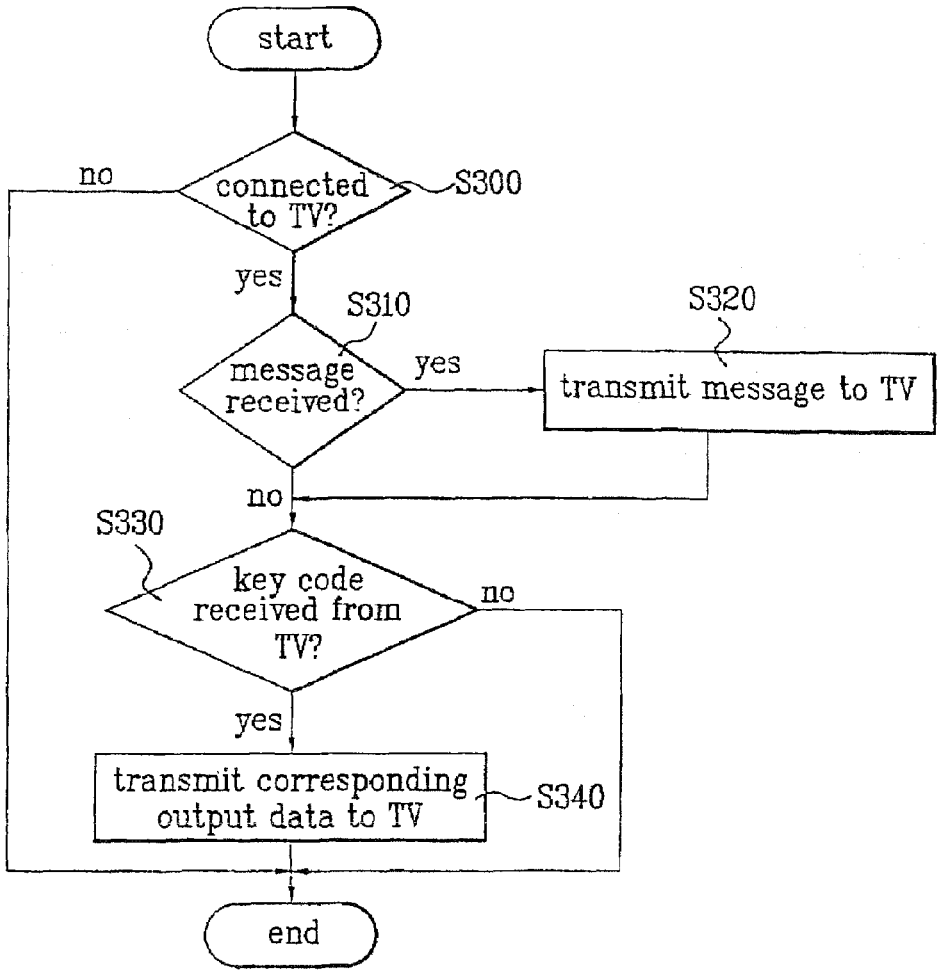
FIG. 4 illustrates a flow chart illustrating a method of interacting with a TV system for a mobile telephone in accordance with the present invention.

Finally, the microcomputer 314 further checks whether any output data has been received from the mobile telephone 100 (S190). If it is confirmed that the output data has been received, the television system 300 performs a corresponding function according to the data received (S200). For example, it will display the text/image data included in the output data received from the mobile telephone 100 on the display unit 317 and output the sound data through the speaker 318. The steps of S150 to S200 may be repeated until the user inputs no further user command. In addition, the first or second key index displayed in the step S120 or S140 may be undisplayed if it is determined that the user inputs no further user command FIG. 4 is a flow chart illustrating the steps carrying out a method of interacting with a mobile telephone 100 using an interactive television system 300 according to the present invention. As shown in FIG. 4, first of all, the controller (not illustrated) of the mobile telephone 100 checks whether the interactive television system 300 is connected to the mobile telephone 100 (S300). Next, if it is confirmed in the step S300 that the television system 300 is connected to the mobile telephone 100, it further checks whether any one of text, image, and voice messages is received from a message sender (S310). If the mobile telephone 100 has received such message, it transmits the message to the television system 300 (S320). Then the television system 300 displays the image or text message on the display unit 317 and outputs the voice message through the speaker 318.

On the other hand, if it is found in the step S310 that there is no data received, the controller of the mobile telephone 100 further checks whether any key code is received from the television system 300 (S330). If it is found in the step S330 that the mobile telephone 100 received a key code from the television system 300, then the mobile telephone performs a corresponding function and transmits output data that it generates upon performing the function to the television system (S340). Subsequently, the display unit 317 of the television system 300 displays the text/image data and outputs the sound data included in the output data through the speaker 318.

According to the method of the present invention described above, a user is able to interact with a mobile telephone using an interactive television system by displaying the text/image data received from the telephone and by inputting various telephone function commands using a remote control unit. Upon receiving a function command from the television system that the user has inputted through the remote control unit, the output data that the mobile telephone generates in response to the function command is transmitted to television system. Finally the text/image data of the output data is displayed on a display unit of the television system and the sound data is outputted through a speaker. As a result, a user may conveniently interact with the mobile telephone using the display unit and speaker of the television system and a remote control unit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

[1. An apparatus for interacting with a mobile telephone, the apparatus comprising:

a TV remote control unit configured to receive a command and to transmit said command, the TV remote control unit including one or more channel-changing keys and one or more volume-changing keys; and a TV system coupled to a mobile telephone, wherein said TV system is configured to receive said command from said TV remote control unit, to recognize said command as a telephone function command, and to transmit said telephone function command to said mobile telephone if said TV system is set to a telephone mode, wherein said telephone function command includes information related to a voice call processing capability or at least one of an electronic mail capability or a text message capability of said mobile telephone, wherein said TV system is further configured to output an output data set transmitted to said TV system from said mobile telephone in response to said transmitted telephone function command, and wherein the TV system displays a first on-screen display (OSD) guide containing an image of keys of the TV remote control unit, said first OSD guide mapping one or more keys of the TV remote control unit to one or more telephone functions when the TV system is set in said telephone mode, the telephone function command being generated based on the mapping in said first OSD of the one or more keys of the TV remote control unit to said one or more telephone functions, and wherein the TV system further displays a second OSD guide mapping one or more keys of the TV remote control unit to one or more television functions when the TV system is set in a television mode, said TV remote control further including one or more keys for allowing a user to switch the TV system between said television mode and said telephone mode.]

[2. The apparatus of claim 1, wherein said TV system includes a display unit configured to display text or image data included in said output data set.]

[3. The apparatus of claim 2, wherein said TV system further comprises a speaker configured to output sound data included in said output data set.]

[4. The apparatus of claim 1, wherein said mobile telephone comprises:

a TV interface unit configured to interface with said TV system so as to receive said function command from said TV system and to transmit said output data set to said TV system; and a controller configured to generate a control signal including said output data set in response to said function command and to transmit said output data set to said TV system.]

[5. The apparatus of claim 1, wherein said TV system comprises:

a remote-control interface circuit configured to receive said command from said remote control unit;

a telephone interface circuit configured to interface with said mobile telephone so as to transmit said function command to said mobile telephone and to receive said output data set from said mobile telephone;

a microcomputer configured to generate a control signal including said output data set received from said mobile telephone;

a video/audio signal processor configured to combine text and image data included in said output data set with original image data according to said control signal; and a display unit configured to display said combined data.]

[6. The apparatus of claim 1, wherein the output data set comprises data related to a web browsing capability of the mobile telephone.]

[7. The apparatus of claim 1, wherein the output data set comprises data related to a text messaging capability of the mobile telephone.]

[8. The apparatus of claim 1, wherein the output data set comprises data related to an electronic mail capability of the mobile telephone.]

[9. The apparatus of claim 1, wherein the output data set comprises data related to photographs provided by the mobile telephone.]

[10. The apparatus of claim 1, wherein said TV system is directly connected to said mobile telephone so as to allow a user to receive incoming telephone calls and to place outgoing telephone calls.]

[11. A method for interacting with a mobile telephone using a TV system with a TV remote control unit, the method comprising:

(a) displaying a first on-screen display (OSD) guide on a screen of said TV system if said TV system is set to a telephone mode, the first OSD guide mapping one or more keys of a TV remote control unit to one or more telephone functions when the TV system is set in said telephone mode;

(b) receiving a first command from said TV remote control unit by said TV system, said first command generated based on the mapping in said first OSD of the one or more keys of the TV remote control unit to said one or more telephone functions;

(c) recognizing said first user command as a telephone function command and transmitting said function command to said mobile telephone, wherein said telephone function command includes information related to a voice call processing capability or at least one of an electronic mail capability or a text message capability of said mobile telephone; and (d) receiving an output data set generated by said mobile telephone in response to said transmitted function command and displaying image or text data included in said output data set on said TV display unit, said method further comprising:

(e) receiving signals from the TV remote control unit, resulting from activation of one or more keys of the TV remote control unit, to switch the TV system between a television mode and said telephone mode; and (f) displaying a second OSD guide mapping one or more keys of the TV remote control unit to one or more television functions when the TV system is set in said television mode.]

[12. The method of claim 11, further comprising outputting sound data included in said output data set through a speaker of said TV system.]

[13. The method of claim 12, wherein outputting sound data comprises outputting messages provided by a voice mail capability of the mobile telephone.]

[14. The method of claim 11, further comprising repeating steps (b) through (d) until no further commands are received.]

[15. The method of claim 11, further comprising:

receiving a second command from said TV remote control unit; and recognizing said second user command as a TV function command and performing a corresponding TV function.]

[16. The method of claim 11, wherein displaying images or text data comprise displaying data related to a web browsing capability of the mobile telephone.]

[17. The method of claim 11, wherein displaying image or text data comprises displaying data related to a text messaging capability of the mobile telephone.]

[18. The method of claim 11, wherein displaying image or text data comprises displaying data related to an electronic mail capability of the mobile telephone.]

[19. The method of claim 11, wherein displaying image or text data comprises displaying data related to photographs provided by the mobile telephone.]

[20. The method of claim 11, further comprising using said TV system and said mobile telephone connected directly thereto to connect incoming and outgoing telephone calls.]

[21. A method which allows a mobile telephone to interact with a TV system including a TV remote control unit, the method comprising:

checking whether said mobile telephone is connected to a TV system;

receiving signals from the TV remote control unit designating an operating mode of the television, wherein a first signal results from activation of a telephone mode key on the TV remote control unit to place the TV system is a telephone mode and a second signal results from activation of a television mode key on the TV remote control unit to place the TV system in a television mode, wherein the phone mode key and the television key are different keys on the TV remote control unit;

receiving a telephone function command generated by said TV system in response to a command received from said TV remote control unit while in said telephone mode, wherein said telephone function command includes information related to a voice call processing capability or at least one of an electronic mail capability or a text message capability of said mobile telephone; and generating an output data set in response to said received function command and transmitting said output data set to said TV system, wherein said method further comprises:

displaying a first on-screen display (OSD) guide on a screen of said TV system if said TV system is set to a telephone mode, the first OSD guide mapping one or more keys of a TV remote control unit to one or more telephone functions when the TV system is set in said telephone mode, the telephone function command being generated based on the mapping in said first OSD of the one or more keys of the TV remote control unit to said one or more telephone functions; and displaying a second OSD guide mapping one or more keys of the TV remote control unit to one or more television functions when the TV system is set in said television mode.]

[22. The method of claim 21, wherein said output data set includes at least one of text, image, or sound data generated by said mobile telephone in response to said function command received from said TV system.]

[23. The method of claim 21, further comprising:

checking whether any one of text, voice, or image messages is newly received; and transmitting said newly received message to said TV system.]

[24. A digital television system for interacting with a mobile telephone connected to the digital television system, the digital television system comprising:

a microcomputer for receiving a first key code, for generating a television key index according to a setting of a television mode and a telephone key index according to a setting of a telephone mode, and for determining whether the digital television system is set to the telephone mode, and a TV remote control unit including one or more channel-changing keys and one or more volume-changing keys, at least one of the keys on the TV remote control unit causing the microcomputer to generate the television key index which includes an on-screen display (OSD) guide mapping keys on the remote control unit to corresponding television functions in a television mode, said microcomputer displaying another OSD guide mapping keys on the remote control unit to one or more corresponding telephone functions in a telephone mode in response to another key on the TV remote control unit;

wherein said microcomputer is configured to recognize the input first key code as a telephone function command according to the set mode, to transmit the recognized telephone function command from the digital television system to the mobile telephone if the digital television system is set to the telephone mode, the telephone function command including information related to at least one of an electronic mail capability or a text message capability of said mobile telephone, to receive from the mobile telephone a set of output data generated according to the telephone function command, and to output the generated output data, and wherein the telephone function command is generated based on the mapping in said another OSD of at least one key of the TV remote control unit to said one or more corresponding telephone functions.]

[25. A method for using a digital television system to interact with a mobile telephone connected to the digital television system, the method comprising:

(a) assigning a television key index corresponding to a television mode and a telephone key index corresponding to a telephone mode, the television key index including a first on-screen display (OSD) guide mapping one or more keys of a TV remote control unit to one or more television functions when the digital television system is in said television mode, and the telephone key index including a second OSD guide mapping one or more keys of the TV remote control unit to one or more telephone functions when the digital television system is in said telephone mode;

(b) setting the digital television system to one of the television mode and the telephone mode, the digital television system set to said television mode when a first key of the TV remote control unit is activated and to a telephone mode when a second key of the TV remote control unit is activated;

(c) determining whether the digital television system is set to the telephone mode;

(d) displaying the telephone key index using the first OSD displayed on the digital televisions system, if the digital television system is set to the telephone mode;

(e) selecting a first key code using the first OSD displayed telephone key index, the selected first key code being recognized as a telephone function command according to the set mode, the telephone function command including data related to at least one of an electronic mail capability or a text message capability of said mobile telephone;

(f) transmitting the recognized telephone function command from the digital television system to the mobile telephone;

(g) generating, using the mobile telephone, a set of output data according to the telephone function command;

(h) transmitting the generated set of output data to the digital television system; and (i) outputting the output data using the digital television system.]

[26. The method as claimed in claim 25, wherein selecting a first key code comprises inputting to the digital television system a plurality of key codes in a sequence, each key code corresponding to a telephone function command.]

[27. The method as claimed in claim 26, further comprising:

repeating steps (e) through (i) for each of the plurality of key codes.]

[28. The method as claimed in claim 26, further comprising:

determining whether the key code sequence is completed; and discontinuing said telephone key index displaying if the key code sequence is completed.]

[29. The method as claimed in claim 25, wherein the displayed telephone key index includes at least one icon for selecting the mode of the digital television system.]

[30. The method as claimed in claim 25, wherein the displayed telephone key index includes at least one icon indicative of the set mode of the digital television system.]

[31. The method as claimed in claim 30, wherein one of the at least one icon indicates the set mode of the digital television system to be the television mode.]

[32. The method as claimed in claim 30, wherein one of the at least one icon indicates the set mode of the digital television system to be the telephone mode.]

[33. The method as claimed in claim 25, further comprising:

(j) determining whether the digital television system is set to the television mode;

(k) displaying the television key index using the digital television system, if the digital television system is set to the television mode;

(l) selecting a second key code using the displayed television key index, the selected second key code being recognized as a television function command according to the set mode; and (m) performing a television function corresponding to the television function command.]

[34. The method as claimed in claim 33, wherein selecting a second key code comprises inputting to the digital television system a plurality of key codes in a sequence, each key code corresponding to a television function command.]

[35. The method as claimed in claim 34, further comprising:

repeating steps (1) and (in) for each of the plurality of key codes.]

[36. The method as claimed in claim 34, further comprising:

determining whether the key code sequence is completed; and discontinuing said television key index displaying, if the key code sequence is completed.]

*37. A method for controlling display of information on a display device based on a mobile phone, comprising:*

*receiving, by the display device, broadcasting data;*

*displaying a first on-screen display (OSD) guide on a screen of the display device, the first OSD guide showing one or more items to switch the display device between a first mode and a second mode, wherein the one or more items are to be selected in response to activation of one or more keys of a remote controller;*

*receiving a first command from the remote controller to set the display device to the first mode where a key code is to be generated by manipulating the remote controller and transmitted to the mobile phone, wherein the first command is generated based on mapping a first item of the first OSD guide to activation of one of the keys of the remote controller;*

*recognizing the first command as a phone function command, wherein the phone function command relates to a voice call processing capability or at least one of an electronic mail capability or a text message capability of the mobile phone;*

*after occurrence of an event at the mobile phone, automatically recognizing the occurrence of the event and displaying an indication of the occurrence of the event on the screen of the display device, without checking whether any key code is received;*

*receiving a second command from the remote controller to set the display device to the second mode, wherein the second command is generated based on mapping the first item or another item of the first OSD guide to activation of one of the keys of the remote controller; and*

*displaying a second OSD guide mapping one or more keys of the remote controller to one or more display device functions when the display device is set in the second mode, wherein the first OSD guide is displayed to select either the first mode where the key code can be transmitted to the mobile phone or the second mode where any key code cannot be transmitted to the mobile phone.*

*38. The method of claim 37, wherein the occurrence of the event is not related to a user command input to the mobile phone.*

*39. The method of claim 38, wherein the occurrence of the event includes a reception of a message or a call in the mobile phone.*

*40. The method of claim 39, wherein displaying the indication includes receiving the message from the mobile phone and displaying the received message on the screen of the display device.*

*41. The method of claim 40, wherein the message includes at least one of a text message, an image message, or a voice message.*

*42. The method of claim 41, further comprising:*

*checking whether any one of the text, voice or image messages is newly received at the mobile phone; and*

*receiving the newly received message from the mobile phone.*

*43. The method of claim 37, further comprising:*

*establishing communication with the mobile phone.*

*44. The method of claim 37, wherein displaying the indication comprises receiving an output data set related to the event from the mobile phone and displaying the received output data set.*

*45. The method of claim 37, further comprising:*

*receiving a third command from the remote controller when the display device is set to the second mode; and*

*recognizing the third command as a display device function command and performing a corresponding display device function.*

*46. The method of claim 45, wherein the display device function is a TV function.*

*47. The method of claim 37, wherein displaying the indication includes displaying an indication of a type or content of a message received by the mobile phone.*

*48. The method of claim 37, wherein the displaying the indication includes displaying the message.*

*49. The method of claim 37, wherein, during the first mode, a television program is displayed on the screen of the display device.*

*50. The method of claim 37, wherein the display device is a television.*

*51. A display device comprising:*

*a tuner configured to receive a broadcasting data;*

*a remote control interface configured to receive a command from a remote controller;*

*a mobile phone interface configured to transmit the command to the mobile phone and receive corresponding data from the mobile phone;*

*a display configured to display graphic information; and*

*a microcomputer configured to:*

*display a first on-screen display (OSD) guide, the first OSD guide showing one or more items to switch the display device between a first mode and a second mode, wherein the one or more items are to be selected in response to activation of one or more keys of the remote controller;*

*receive a first command from the remote controller to set the display device to the first mode where a key code is to be generated by manipulating the remote controller and transmitted to the mobile phone, wherein the first command is generated based on mapping a first item in the first OSD guide to activation of one of the keys of the remote controller;*

*recognize the first command as a phone function command, wherein the phone function command relates to a voice call processing capability or at least one of an electronic mail capability or a text message capability of the mobile phone;*

*after occurrence of an event at the mobile phone, automatically recognize the occurrence of the event and displaying an indication of the occurrence of the event on the display without checking whether any key code is received;*

*receive a second command from the remote controller to set the display device to the second mode, wherein the second command is generated based on mapping the first item or another item in the first OSD guide to activation of one of the keys of the remote controller; and*

*display a second OSD guide mapping one or more keys of the remote controller to one or more display device functions when the display device is set in the second mode;*

*wherein the first OSD guide is displayed to select either the first mode where the key code can be transmitted to the mobile phone or the second mode where any key code cannot be transmitted to the mobile phone.*

*52. The display device of claim 49, wherein the occurrence of the event is not related to a user command input to the mobile phone.*

*53. The display device of claim 52, wherein the occurrence of the event includes reception of a message or reception of a call at the mobile terminal.*

*54. The display device of claim 52, wherein the occurrence of the event is reception of a message, and wherein the microcomputer is configured to receive the message from the mobile phone and display the received message on the display as the indication for the occurrence of the event.*

*55. The display device of claim 54, wherein the message includes at least one of a text message, an image message, or a voice message.*

*56. The display device of claim 55, wherein the microcomputer is further configured to:*

*check whether any one of the text, voice or image messages is newly received at the mobile phone; and*

*receive the newly received message from the mobile phone.*

*57. The display device of claim 52, wherein the microcomputer is configured to receive an output data set related to the event from the mobile phone and display the received output data set as the indication for the occurrence of the event.*

*58. The display device of claim 49, wherein the microcomputer is further configured to establish communication with the mobile phone via the mobile phone interface.*

*59. The display device of claim 51, wherein the microcomputer is further configured to:*

*receive a third command from the remote controller when the display device is set to the second mode; and*

*recognize the third command as a display device function command and performing a corresponding display device function.*

*60. The display device of claim 59, wherein the display device function is a TV function.*

*61. The display device of claim 51, wherein the indication includes displaying an indication of a type or content of a message received by the mobile phone.*

*62. The display device of claim 51, wherein the microcomputer displays the indication includes displaying the message.*

*63. The display device of claim 51, wherein, during the first mode, a television program is displayed on a screen of the display.*

*64. The display device of claim 51, wherein the display device is a television.*

* * * * *